F. M. WHYTE.
UNLOCKING MECHANISM FOR CAR COUPLINGS.
APPLICATION FILED JAN. 10, 1914.
1,151,982.
Patented Aug. 31, 1915.
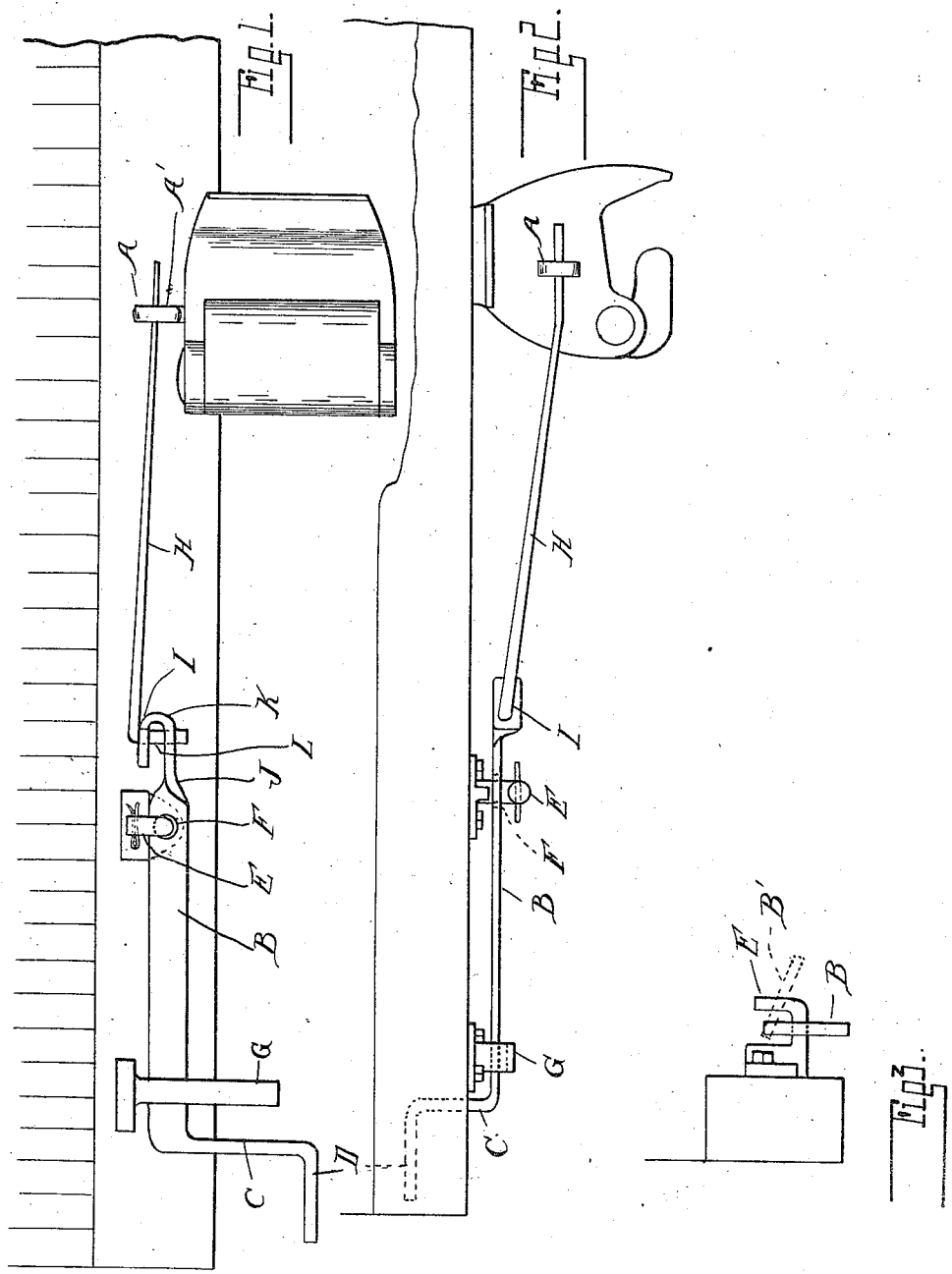

UNITED STATES PATENT OFFICE.

FREDERICK M. WHYTE, OF TARRYTOWN, NEW YORK, ASSIGNOR TO HUTCHINS CAR ROOFING COMPANY, OF DETROIT, MICHIGAN, A CORPORATION OF MICHIGAN.

UNLOCKING MECHANISM FOR CAR-COUPLINGS.

1,151,982.   Specification of Letters Patent.   Patented Aug. 31, 1915.

Application filed January 10, 1914.   Serial No. 811,296.

*To all whom it may concern:*

Be it known that I, FREDERICK M. WHYTE, a citizen of the United States of America, residing at Tarrytown, in the county of Westchester and State of New York, have invented certain new and useful Improvements in Unlocking Mechanism for Car-Couplings, of which the following is a specification, reference being had therein to the accompanying drawings.

The invention relates to mechanism for controlling the unlocking of car couplers and has for its object the obtaining of a simple construction which is operable either as a lever or as a crank.

In the drawings:—Figure 1 is an end elevation of a car showing the operating mechanism in position; Fig. 2 is a plan view thereof; Fig. 3 is a cross section showing the arrangement of the fulcrum bracket.

A is the coupler locking pin, which is of any suitable construction adapted for coöperation with a car coupler A'.

B is a rod, preferably formed of a flat bar having an end portion C bent to form a crank with an operating handle D at the outer end thereof.

E is a hook-shaped bracket engaging an aperture F near the inner end of the bar B, and of such a shape that when the crank C is turned the bar is permitted to rotate into the position shown in dotted lines at B', Fig. 3. At the same time the bracket E forms a fulcrum around which the bar B may be turned by a vertical movement thereof, as when the unlocking arrangement is used as a lever.

G is a bracket secured to the end of the car, and when the uncoupling arrangement is operated as a crank by rotating D in a direction outward from the end of the car, then G becomes the fulcrum of the crank C. Also it is obvious that D may be depressed and rotated outward from the end of the crank at the same time, and the lock A will be lifted the same as with either movement made separately. To provide for the relative movement of the coupler, draft rigging and the car body, the connection between the bar B and the pin A is formed by a separate bar H pivotally connected to the inner end of the bar B at I, as shown in Figs. 1 and 2. This pivotal connection is preferably formed by twisting the flat bar B at J and forming a return-bent portion K, which is apertured to form a bifurcated bearing for a laterally-extending portion L on the bar H. The opposite end of the bar H passes through the eye A' in the pin A, so as to permit of a longitudinal sliding therein. The normal location of the pin A is off-set from the axis of the bar B, and consequently when the crank C is turned the angular relation of the bar H will form in effect another crank or rock-arm, which will raise the pin A and so open the coupler lock.

In use, the operating mechanism may be actuated either by a turning of the crank C, as just described, or by a depression of the bar B. Thus the attendant, who may be upon the car, may step upon the bar B at D and in that manner depress the same, raising the bar H which is upon the opposite side of the fulcrum bracket E, and thereby releasing the coupler lock. On the other hand, the mechanism may be operated with equal facility by the turning of the crank C.

What I claim as my invention is,—

1. An uncoupling device for car couplers comprising a rod connected at one end to the coupler locking member and extending with its opposite end near the side of the car, and a plurality of spaced supporting members adapted to support the rod, said supporting members providing fulcrum points for the rod to permit of the alternating actuation of the rod as a lever and a rock shaft.

2. An uncoupling device for car couplers comprising a rod connected at one end to the coupler locking member and extending with its opposite end near the side of the car, said rod being apertured intermediate its end, a hook-shaped support adapted to engage the rod through the aperture, said hook-shaped support forming a fulcrum point for the rod upon a vertical movement thereof, and a bracket spaced from the hook-shaped support adapted to constitute a fulcrum point for the rod upon a rotary movement thereof.

3. An uncoupling device for car couplers comprising a rod connected at one end to the coupler locking member and extending with its opposite end near the side of the car, said rod being apertured intermediate its ends, a hook shaped support carried by the car adapted to engage the rod through the aperture for supporting said rod and permitting of the alternative actuation of the same as a lever and a rock shaft.

4. An uncoupling device for car couplers comprising a bar having a handle at one end, and its opposite end being twisted and formed with a portion bent upon itself, to provide a relatively broad face with an aperture therethrough, means carried by the car for supporting said bar to permit vertical and rotary movement thereof, and a coupler locking member provided with a portion adapted to pass through said aperture, said locking member being supported by the relatively broad face of the bar.

In testimony whereof I affix my signature in presence of two witnesses.

FREDERICK M. WHYTE.

Witnesses:
A. E. POWERS,
CLARA H. CLARK.